US012275263B2

(12) United States Patent
Sugiura et al.

(10) Patent No.: US 12,275,263 B2
(45) Date of Patent: Apr. 15, 2025

(54) THERMOSENSITIVE RECORDING MEDIUM AND METHOD FOR PRODUCING THERMOSENSITIVE RECORDING MEDIUM

(71) Applicants: Kaito Sugiura, Shizuoka (JP); Kenji Shimizu, Shizuoka (JP)

(72) Inventors: Kaito Sugiura, Shizuoka (JP); Kenji Shimizu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 17/906,626

(22) PCT Filed: Mar. 9, 2021

(86) PCT No.: PCT/JP2021/009114

§ 371 (c)(1),
(2) Date: Sep. 19, 2022

(87) PCT Pub. No.: WO2021/192980

PCT Pub. Date: Sep. 30, 2021

(65) Prior Publication Data

US 2023/0147446 A1 May 11, 2023

(30) Foreign Application Priority Data

Mar. 23, 2020 (JP) ................................ 2020-050580

(51) Int. Cl.
*B41M 5/42* (2006.01)
*B41M 5/323* (2006.01)
*B41M 5/44* (2006.01)

(52) U.S. Cl.
CPC .............. *B41M 5/42* (2013.01); *B41M 5/323* (2013.01); *B41M 5/426* (2013.01); *B41M 5/44* (2013.01);

(Continued)

(58) Field of Classification Search
CPC ........ B41M 5/323; B41M 5/42; B41M 5/426; B41M 5/44; B41M 2205/04; B41M 2205/38
See application file for complete search history.

(56) References Cited

U.S. PATENT DOCUMENTS

| | | | | |
|---|---|---|---|---|
| 4,507,669 | A | 3/1985 | Sakamoto et al. | |
| 6,746,718 | B2 * | 6/2004 | Yokota .................. | B41M 5/502 427/407.1 |

(Continued)

FOREIGN PATENT DOCUMENTS

| | | | |
|---|---|---|---|
| EP | 0992364 | A2 | 4/2000 |
| EP | 2070714 | A1 | 6/2009 |

(Continued)

OTHER PUBLICATIONS

Japanese Office Action dated Sep. 12, 2023, in Japanese Application No. 2020-050580, 2 pages.

(Continued)

*Primary Examiner* — Gerard Higgins
(74) *Attorney, Agent, or Firm* — Grüneberg and Myers PLLC

(57) ABSTRACT

A thermosensitive recording medium includes a support; a first underlayer disposed on or above the support; a second underlayer disposed on or above the first underlayer; and a thermosensitive recording layer disposed on or above the second underlayer. The second underlayer and the thermosensitive recording layer are formed by simultaneous curtain coating. Surface smoothness of a surface of the thermosensitive recording medium is 1,000 s or greater.

9 Claims, 1 Drawing Sheet

(52) U.S. Cl.
CPC ..... *B41M 2205/04* (2013.01); *B41M 2205/12* (2013.01); *B41M 2205/38* (2013.01)

(56) References Cited

U.S. PATENT DOCUMENTS

| | | | |
|---|---|---|---|
| 2007/0111888 A1 | 5/2007 | Mito et al. | |
| 2010/0062936 A1 | 3/2010 | Orihara et al. | |
| 2011/0065575 A1 | 3/2011 | Shimizu et al. | |
| 2011/0224074 A1 | 9/2011 | Okada et al. | |
| 2012/0202686 A1* | 8/2012 | Doi | B41M 5/3377 503/207 |
| 2014/0148334 A1 | 5/2014 | Shimizu et al. | |
| 2015/0367663 A1 | 12/2015 | Yamane et al. | |
| 2019/0152248 A1 | 5/2019 | Noda et al. | |

FOREIGN PATENT DOCUMENTS

| | | | |
|---|---|---|---|
| JP | 58-134788 | 8/1983 | |
| JP | 59-005093 | 1/1984 | |
| JP | 63-209882 | 8/1988 | |
| JP | H04-65287 | 3/1992 | |
| JP | H06-106855 | 4/1994 | |
| JP | 2000-108518 | 4/2000 | |
| JP | 2001018526 A * | 1/2001 | B41M 5/42 |
| JP | 2010-094981 | 4/2010 | |
| JP | 4793385 | 10/2011 | |
| JP | 2011-255554 | 12/2011 | |
| JP | 2016193394 A * | 11/2016 | B01D 19/00 |

OTHER PUBLICATIONS

International Search Report Issued Jun. 21, 2021 for counterpart International Patent Application No. PCT/JP2021/009114 filed Mar. 9, 2021.

* cited by examiner

THERMOSENSITIVE RECORDING MEDIUM AND METHOD FOR PRODUCING THERMOSENSITIVE RECORDING MEDIUM

CROSS-REFERENCE TO RELATED APPLICATIONS

This application is a National Stage entry under § 371 of International Application No. PCT/JP2021/009114, filed on Mar. 9, 2021, and which claims the benefit of priority to Japanese Application No. 2020-050580, filed on Mar. 23, 2020. The content of each of these applications is hereby incorporated by reference in its entirety.

BACKGROUND OF THE INVENTION

Field of the Invention

The present disclosure relates to a thermosensitive recording medium, and a method for producing a thermosensitive recording medium.

Description of Related Art

Thermosensitive recording media is widely used in various fields, such as a POS field for fresh food products, packed meals, and premade meals; a copying field for books and documents; a telecommunication field, such as facsimiles; a ticketing field for ticket machines, and receipts; and packaging tags for the aviation industry.

In recent years, to achieve the higher qualities (e.g. high sensitivity and high image quality) of thermosensitive recording media has been desired to match with versatility of use and high performances of devices for use.

In the art, proposed is a thermosensitive recording medium in which a first underlayer, a second underlayer, and a thermosensitive recording layer are separately formed by rod coating or blade coating (see, for example, PTL 1).

Moreover, proposed is a thermosensitive recording medium in which a first underlayer and a second underlayer are formed by simultaneous curtain coating, and a thermosensitive recording layer is separately formed on the second underlayer by blade coating (see, for example, PTL 2).

CITATION LIST

Patent Literature

PTL 1: Japanese Patent No. 4793385

PTL 2: Japanese Unexamined Patent Application Publication No. 2011-255554

SUMMARY OF INVENTION

Technical Problem

The present disclosure has an object to provide a thermosensitive recording medium having excellent sensitivity and precision.

Solution to Problem

According to one aspect of the present disclosure, a thermosensitive recording medium includes a support, a first underlayer disposed on or above the support, a second underlayer disposed on or above the first underlayer, and a thermosensitive recording layer disposed on or above the second underlayer. The second underlayer and the thermosensitive recording layer are formed by simultaneous curtain coating, and surface smoothness of a surface of the thermosensitive recording medium is 1,000 s or greater.

Advantageous Effects of Invention

The present disclosure can provide a thermosensitive recording medium having excellent sensitivity and precision.

DETAILED DESCRIPTION OF THE INVENTION (Thermosensitive Recording Medium)

The thermosensitive recording medium of the present disclosure includes a support, a first underlayer disposed on or above the support, a second underlayer disposed on or above the first underlayer, and a thermosensitive recording layer disposed on or above the second underlayer. The thermosensitive recording medium may further include a protective layer, an adhesive layer, and other layers according to the necessity. The second underlayer and the thermosensitive recording layer are formed by simultaneous curtain coating. Surface smoothness of a surface of the thermosensitive recording medium is 1,000 s or greater.

The second underlayer and the thermosensitive recording layer are formed by simultaneous curtain coating.

The simultaneous curtain coating is a method where two or more coating liquids, such as a thermosensitive recording layer coating liquid are simultaneously applied as curtain films from separate heads, or two or more coating outlets in one head. Since the second underlayer and the thermosensitive recording layer are formed by simultaneous curtain coating in the present disclosure, high surface smoothness of the thermosensitive recording layer is achieved, and therefore a thermosensitive recording medium having excellent sensitivity and precision can be obtained. Moreover, the number of processes, and cost of installation of equipment can be reduced as two or more layers are formed by simultaneous curtain coating.

Figure 1:
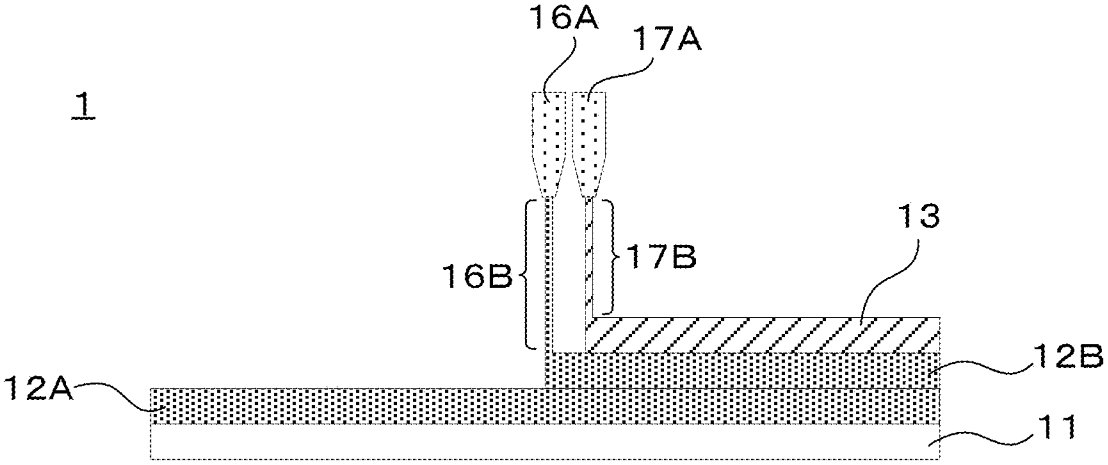
FIG. 1 is a schematic view illustrating formation of a second underlayer and a thermosensitive recording layer by simultaneous curtain coating in the method for producing a thermosensitive recording medium of the present disclosure.

FIG. 1 is a schematic view illustrating the method for producing a thermosensitive recording medium of the present disclosure, where a second underlayer and a thermosensitive recording layer are formed by simultaneous curtain coating. As illustrated in FIG. 1, a curtain film 16B formed of a second underlayer coating liquid is applied onto a first underlayer 12A from a head 16A to form a second underlayer 12B. During the formation of the second underlayer 12B, a curtain film 17B formed of a thermosensitive recording layer coating liquid is applied onto the second underlayer 12B from a head 17A arranged adjacent to the head 16A, to thereby form a thermosensitive recording layer 13. As a result, the second underlayer 12B and the thermosensitive recording layer 13 can be formed simultaneously.

The surface smoothness is 1,000 s or greater, preferably 1,600 s or greater, and more preferably 2,000 s or greater. When the surface smoothness is 1,000 s or greater, a thermosensitive recording medium having excellent sensitivity and precision can be obtained.

The surface smoothness can be measured by means of an Oken-type smoothness tester according to JIS P-8155.

Figure 2A:
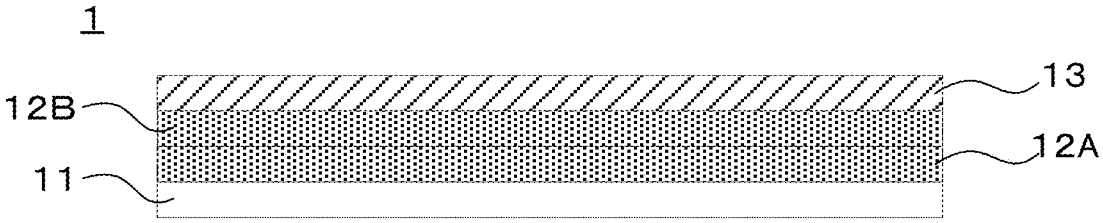
FIG. 2A is a schematic view illustrating one example of the thermosensitive recording medium of the present disclosure.
Figure 2B:
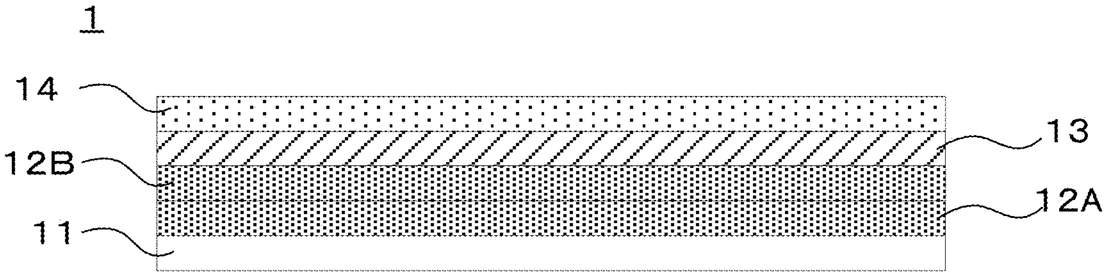
FIG. 2B is a schematic view illustrating another example of the thermosensitive recording medium of the present disclosure.
Figure 2C:
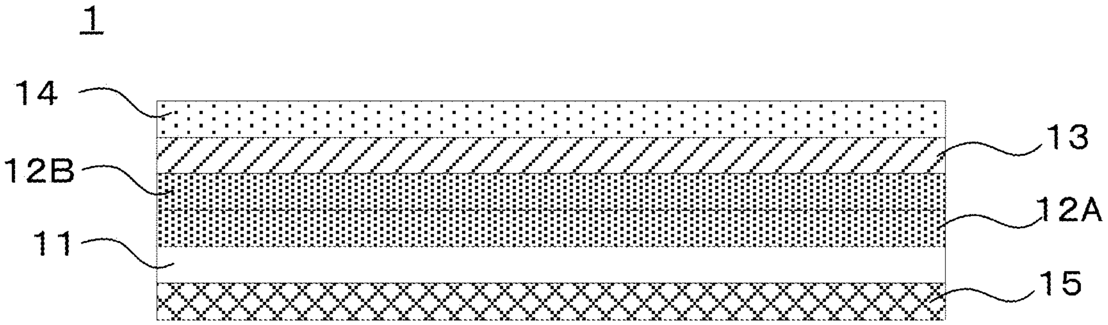
FIG. 2C is a schematic view illustrating another example of the thermosensitive recording medium of the present disclosure.

FIG. 2A is a view illustrating one example of the thermosensitive recording medium of the present disclosure. In the thermosensitive recording medium 1, as illustrated in 2A, a first underlayer 12A is disposed on a support 11, a second underlayer 12B is disposed on the first underlayer 12A, and a thermosensitive recording layer 13 is disposed on the second underlayer 12B. Moreover, as illustrated in FIG. 2B, a protective layer 14 may be disposed on the thermosensitive recording layerl3. As illustrated in FIG. 2C, an adhesive layer 15 may be disposed on a surface of the support 11 opposite to a surface thereof at the side of which the thermosensitive recording layer 13 is disposed.

A thermosensitive recording medium disclosed in PTL 1 has the following problems as a first underlayer, a second underlayer, and a thermosensitive recording layer are each separately formed. That is, surface smoothness of a thermosensitive recording layer is low because the first underlayer penetrates into recesses formed in a surface of a support, and therefore sensitivity and precision of a thermosensitive recording medium become low. Moreover, a coating step and a drying step are performed for formation of each of a first underlayer, a second underlayer, and a thermosensitive recording layer, and the number of processes increases.

The number of processes for forming a thermosensitive recording medium disclosed in PTL 2 is reduced by forming a first underlayer and a second underlayer by simultaneous curtain coating. As a thermosensitive recording layer is formed separately, however, surface smoothness of a thermosensitive recording layer is low because the first underlayer penetrates into recesses formed in a surface of a support, and therefore sensitivity and precision of a thermosensitive recording medium become low.

Accordingly, the present inventors have diligently performed researches. As a result of the researches, the present inventors have found that excellent sensitivity and precision of a thermosensitive recording medium can be achieved when the thermosensitive recording medium includes a support, a first underlayer disposed on or above the support, a second underlayer disposed on or above the first underlayer, and a thermosensitive recording layer, where the second underlayer and the thermosensitive recording layer are formed by simultaneous curtain coating, and surface smoothness of a surface of the thermosensitive recording medium is 1,000 s or greater. Moreover, the surface smoothness of the surface of the thermosensitive recording medium can be adjusted to 1,000 s or greater by forming the second underlayer and the thermosensitive recording layer by simultaneous curtain coating.

<Thermosensitive Recording Layer>

The thermosensitive recording layer includes a leuco dye, color developer, and a binder resin, and may further include other components according to the necessity.

—Leuco Dye—

The leuco dye is not particularly limited and may be appropriately selected depending on the intended purpose. Examples of the leuco dye include leuco compounds, such as triphenylmethane-based dyes, fluoran-based dyes, phenothiazine-based dyes, auramine-based dyes, spiropyran-based dyes, and indolinophthalide-based dyes. The above-listed examples may be used alone or in combination.

Examples of the leuco compound include 3-dibutylamino-6-methyl-7-aniliofluoran,
3,3-bis(p-dimethylaminophenyl)-phthalide,
3,3-bis(p-dimethylaminophenyl)-6-dimethylaminophthalide (also known as crystal violet lactone), 3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide, 3-cyclohexylamino-6-chlorofluoran,
3-dimethylamino-5,7-dimethylfluoran, 3-diethylamino-7-chlorofluoran,
3-diethylamino-7-methylfluoran, 3-diethylamino-7,8-benzfluoran,
3-diethylamino-6-methyl-7-chlorofluoran,
3-(N-p-tolyl-N-ethylamino)-6-methyl-7-anilinofluoran,
2-{N-(3'-trifluoromethylphenyl)amino}-6-diethylaminofluoran,
2-{3,6-bis(diethylamino)-9-(o-chloroanilino)xanthyl lactam benzoate},
3-diethylamino-6-methyl-7-(m-trichloromethylanilino)fluoran,
3-diethylamino-7-(o-chloroanilino)fluoran, 3-pyrrolidino-6-methyl-7-anilinofluoran,
3-di-n-butylamino-7-o-chloroanilino)fluoran,
3-N-methyl-N,n-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino) fluoran, benzoyl leuco methylene blue, 6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5' chlorophenyl)phthalide,
3-(2'-hydroxy-W-dimethylaminophenyl)-3-(2'-methoxy-5'-nitrophenyl)phthalide,
3-(2'-hydroxy-W-diethylaminophenyl)-3-(2'-methoxy-5'-methylphenyl)phthalide,
3-(2'-methoxy-W-dimethylaminophenyl)-3-(2'-hydroxy-W-chloro-5'-methylphenyl)phthalide, 3-(N-ethyl-N-tetrahydrofurfuryl)amino-6-methyl-7-anilinofluoran,
3-N-ethyl-N-(2-ethoxypropyl)amino-6-methyl-7-anilinofluoran,
3-N-methyl-N-isobutyl-6-methyl-7-anilinofluoran,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)fluoran,
3-di-n-butylamino-6-methyl-7-anilinofluoran, 3,6-bis(dimethylamino)fluorene Spiro (9,3')-6'-dimethylaminophthalide,
3-(N-benzyl-N-cyclohexylamino)-5,6-benz-7-α-naphthylamino-4'-bromofluoran,
3-diethylamino-6-chloro-7-anilinofluoran,
3-diethylamino-6-methyl-7-mesitidino-4',5'-benzfluoran, 3-N-methyl-N-isopropyl-6-methyl-7-anilinofluoran,
3-N-ethyl-N-isoamyl-6-methyl-7-anilinofluoran,
3-diethylamino-6-methyl-7-(2',4'-dimethylanilino)fluoran,
3-diethylamino-5-chloro-(α-phenylethylamino)fluoran,
3-diethylamino-7-piperidinofluoran,
3-(N-benzyl-N-cyclohexylamino)-5,6-benzo-7-α-naphthylamino-W-bromofluoran,
3-N-ethyl-N-tetrahydrofurfrylamino-6-methyl-7-anilinofluoran,
3-p-dimethylaminophenyl)-3-{1,1-bis(p-dimethylaminophenyl)ethylen-2-yl}phthalide,
3-(p-dimethylaminophenyl)-3-{1,1-bis(p-dimethylaminophenyl)ethylen-2-yl}-6-dimethylaminophthalide,
3-(p-dimethylaminophenyl)-3-(1-p-dimethylaminophenyl-1-phenylethylen-2-yl)phthalide,
3-(p-dimethylaminophenyl)-3-(1-p-dimethylaminophenyl-1-p-chlorophenylethylen-2-yl-6-dimethylaminophthalide, 3-(4'-dimethylamino-2'-methoxy)-3-(1"-p-dimethylaminophenyl-1"-p-chlorophenyl-1' ',3"-butadien-4"-yl) benzophthalide, 3-(4"-dimethylamino-2'-benzyloxy)-3-(1"-p-dimethylaminophenyl-1"-phenyl-1",3"-butadien-4"-yl) benzophthalide, 3-dimethylamino-6-dimethylamino-fluorene-9-spiro-3'-(6'-dimethylamino) phthalide, 3,3-bis(2-(p-dimethylaminophenyl)-2-p-methoxyphenyl)ethenyl)-4,5,6,7-tetrachlorophthalide, 3-bis {1,1-bis(4-pyrrolidinophenyl)ethylen-2-yl}-5,6-dichloro-4,7-dibromophthalide, bis(p-dimethylaminostyryl)-1-naphthalenesulfonylmethane, and bis(p-dimethylaminostyryl)-1-p-tolylsulfonylmethane.

The 50% cumulative volume particle diameter ($D_{50}$) of the leuco dye is preferably 0.1 micrometers or greater but 0.5 micrometers or less, and more preferably 0.1 micrometers or greater but 0.4 micrometers or less.

A method for measuring the 50% cumulative volume particle diameter ($D_{50}$) of the leuco dye is not particularly limited and may be appropriately selected depending on the intended purpose. For example, the 50% cumulative volume particle diameter ($D_{50}$) of the leuco dye can be measured by means of a laser diffraction/scattering particle diameter distribution measuring device (device name: LA-920, available from Horiba, Ltd.).

An amount of the leuco dye is not particularly limited and may be appropriately selected depending on the intended purpose. The amount of the leuco dye is preferably 5 parts by mass or greater but 40 parts by mass or less, and more preferably 10 parts by mass or greater but 30 parts by mass or less, relative to 100 parts by mass of a total amount of the thermosensitive recording layer.

—Color Developer—

As the color developer, various electron-accepting materials for reacting with the leuco dye upon heating to color the leuco dye.

The color developer is not particularly limited and may be appropriately selected depending on the intended purpose. Examples thereof include phenolic compound, an organic acidic material, an inorganic acidic material, esters thereof, and salts thereof.

Examples of the color developer include gallic acid, salicylic acid,
3-isopropylsalicylic acid, 3-cyclohexylsalicylic acid, 3,5-di-tert-butylsalicylic acid, 3,5-di-α-methylbenzylsalicylic acid, 4,4'-isopropylidenediphenol, 1,1'-isopropylidene bis (2-chlorophenol), 4,4'-isopropylidene bis(2,6-dibromophenol), 4,4'-isopropylidene bis(2,6-dichlorophenol), 4,4'-isopropylidene bis(2-methylphenol), 4,4'-isopropylidene bis(2,6-dimethylphenol), 4,4-isopropylidene bis(2-tert-butylphenol), 4,4'-sec-butylidene diphenol, 4,4'-cyclohexylidene bisphenol, 4,4'-cyclohexylidene bis(2-methylphenol), 4-tert-butylphenol, 4-phenylphenol, 4-hydroxy diphenoxide, α-naphthol, β-naphthol, 3,5-xylenol, thymol, methyl-4-hydroxybenzoate, 4-hydroxyacetophenone, a novolac-type phenol resin, 2,2'-thiobis(4,6-dichlorophenol), catechol, resorcin, hydroquinone, pyrogallol, phloroglucinol, phloroglucinol carboxylic acid, 4-tert-octylcatechol, 2,2'-methylenebis(4-chlorophenol), 2,2'-methylenebis(4-methyl-6-tert-butylphenol), 2,2,-dihydroxydiphenyl, 2,4'-dihydroxydiphenylsulfone, 4,4'-[oxybis(ethyleneoxy-P-phenylenesulfonyl)]diphenol, ethyl p-hydroxybenzoate, propyl p-hydroxybenzoate, butyl p-hydroxybenzoate, benzyl p-hydroxybenzoate, p-chlorobenzyl p-hydroxybenzate, o-chlorobenzyl p-hydroxybenzate, p-methylbenzyl p-hydroxybenzate, n-octyl p-hydroxybenzate, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4-hydroxy-4'-chlorodiphenyl sulfone, bis(4-hydroxyphenyl)sulfide, 2-hydroxy-p-toluic acid, zinc 3,5-di-tert-butyl salicylate, tin 3,5-di-tert-butyl salicylate, tartaric acid, oxalic acid, maleic acid, citric acid, succinic acid, stearic acid, 4-hydroxyphthalic acid, boric acid, a thiourea derivative, a 4-hydroxythiophenol derivative, bis(4-hydroxyphenyl)acetic acid, ethyl bis(4-hydroxyphenyl)acetate, n-propyl bis(4-hydroxyphenyl)acetate, m-butyl bis(4-hydroxyphenyl)acetate, phenyl bis(4-hydroxyphenyl)acetate, benzyl bis(4-hydroxyphenyl)acetate, phenethyl bis(4-hydroxyphenyl)acetate, bis(3-methyl-4-hydroxyphenyl)acetic acid, methyl bis(3-methyl-4-hydroxyphenyl)acetate, n-propyl bis(3-methyl-4-hydroxyphenyl)acetate, 1,7-bis(4-hydroxyphenylthio) 3,5-dioxaheptane, 1,5-bis(4-hydroxyphenylthio)3-oxaheptane, dimethyl 4-hydroxyphthalate, 4-hydroxy-4'-methoxydiphenylsulfone, 4-hydroxy-4'-ethoxydiphenylsulfone, 4-hydroxy-4'-isopropoxydiphenylsulfone, 4-hydroxy-4'-propoxydiphenylsulfone, 4,4'-bis(3-(phenoxycarbonylamino)methylphenylureido) diphenylsulfone, 4-hydroxy-4'-butoxydiphenylsulfone, 4-hydroxy-4'-isobutoxydiphenylsulfone, 4-hydroxy-4-butoxydiphenylsulfone, 4-hydroxy-4'-tert-butoxydiphenylsulfone, 4-hydroxy-4'-benzyloxydiphenylsulfone, 4-hydroxy-4'-phenoxydiphenylsulfone, 4-hydroxy-4'-(m-methylbenzyloxy)diphenylsulfone, 4-hydroxy-4'-(p-methylbenzyloxy)diphenylsulfone, 4-hydroxy-4'-(O-methylbenzyloxy)diphenylsulfone, 4-hydroxy-4'-(p-chlorobenzyloxy)diphenylsulfone, N-(2-(3-phenylureido) phenyl)benzene sulfone amide, N-p-toluenesulfonyl-N'-3-(p-toluenesulfonyloxy)phenylurea, N-p-toluenesulfonyl-N'-p-butoxycarbonylphenylurea, N-p-tolylsulfonyl-N'-phenylurea, 4,4'-bis(p-toluenesulfonylaminocarbonylamino)diphenylmethane, and
4,4'-bis[(4-methyl-3-phenoxycarbonylaminophenyl)ureido] diphenylsulfone. The above-listed examples may be used alone or in combination.

The 50% cumulative volume particle diameter ($D_{50}$) of the color developer is preferably 0.1 micrometers or greater but 0.5 micrometers or less, and more preferably 0.1 micrometers or greater but 0.4 micrometers or less.

A method for measuring the 50% cumulative volume particle diameter ($D_{50}$) of the color developer is not particularly limited and may be appropriately selected depending on the intended purpose. For example, the 50% cumulative volume particle diameter ($D_{50}$) of the leuco dye can be measured by means of a laser diffraction/scattering particle diameter distribution measuring device (device name: LA-920, available from Horiba, Ltd.).

An amount of the color developer is not particularly limited and may be appropriately selected depending on the intended purpose. The amount of the color developer is preferably 0.05 parts by mass or greater but 10 parts by mass or less, and more preferably 1 part by mass or greater but 5 parts by mass or less, relative to 1 part by mass of the leuco dye.

—Binder Resin—

The binder resin is not particularly limited and may be appropriately selected depending on the intended purpose. Examples thereof include: a polyvinyl alcohol resin: starch and derivatives thereof; cellulose derivatives, such as hydroxymethyl cellulose, hydroxyethyl cellulose, carboxymethyl cellulose, methyl cellulose, and ethyl cellulose; water-soluble polymers, such as sodium polyacrylate, polyvinyl pyrrolidone, acrylamide-acrylic acid ester copolymers, acrylamide-acrylic acid ester-methacrylic acid terpolymers, styrene-maleic anhydride copolymer alkali salts, isobutylene-maleic anhydride copolymer alkali salts, polyacrylamide, sodium alginate, gelatin, and casein; emulsions of, for example, polyvinyl acetate, polyurethane, polyacrylic acid, polyacrylic acid ester, vinyl chloride-vinyl acetate copolymers, polybutyl methacrylate, and ethylene-vinyl acetate copolymers; styrene-butadiene copolymers; latexes of, for example, styrene-butadiene-acrylic copolymers; and styrene/butadiene copolymer latexes. The above-listed examples may be used alone or in combination. Among the above-listed examples, a polyvinyl alcohol resin is preferable in view of transparency and adhesion to the support.

—Other Components—

Other components are not particularly limited and may be appropriately selected depending on the intended purpose. Examples thereof include various thermofusible materials serving as a sensitizer, an auxiliary additive, a surfactant, a lubricant, filler, a UV absorber, and a color pigment.

—Thermofusible Material—

Examples of the thermofusible materials include: fatty acids, such as stearic acid, and behenic acid; fatty acid amides, such as stearic acid amide, and palmitic acid amide; fatty acid metal salts, such as zinc stearate, aluminium stearate, calcium stearate, zinc palmitate, and zinc behenate; and others, such as p-benzyl biphenyl, terphenyl, triphenylmethane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy)biphenyl, p-aryloxybiphenyl, p-propargyloxybiphenyl, dibenzoyloxymethane, dibenzoyloxypropane, dibenzyl disulfide, 1,1-diphenylethanol, 1,1-diphenylpropanol, p-benzyloxybenzyl alcohol, 1,3-phenoxy-2-propanol, N-octadecylcarbamoyl-p-methoxycarbonyl benzene, N-octadecylcarbamoyl benzene, 1,2-bis(4-methoxyphenoxy)propane, 1,5-bis(4-methoxyphenoxy)-3-oxapentane, dibenzyl oxalate, bis(4-methylbenzyl) oxalate, and bis(4-chlorobenzyl) oxalate. The above-listed examples may be used alone or in combination.

—Auxiliary Additive—

The auxiliary additive is not particularly limited and may be appropriately selected depending on the intended purpose. Examples thereof include a hindered phenol compound and a hindered amine compound. The above-listed examples may be used alone or in combination.

Examples of the Auxiliary Additive Include 2,2'-methylenebis(4-ethyl-6-tert-butylphenol), 4,4'-butylidenebis(6-tert-butyl-2-methylphenol), 1,1,3-tris(2-methyl-4-hydroxy-5-tert-butylphenyl)butane, 1,1,3-tris (2-methyl-4-hydroxy-5-cyclohexylphenyl)butane, 4,4'-thiobis(6-tertiary butyl-2-methylphenol), tetrabromo bisphenol A, tetrabromo bisphenol S, 4,4-thiobis(2-methylphenol), 4,4'-thiobis(2-chlorophenol), tetrakis(1,2,2,6,6-pentamethyl-4-piperidyl)-1,2,3,4-butane tetracarboxylate, and tetrakis(1,2,2,6,6-tetramethyl-4-piperidyl)-1,2,3,4-butane tetracarboxylate. The above-listed examples may be used alone or in combination.

—Surfactant—

The surfactant is not particularly limited and may be appropriately selected depending on the intended purpose. Examples thereof include an anionic surfactant, a nonionic surfactant, an amphoteric surfactant, and a fluorosurfactant. The above-listed examples may be used alone or in combination.

Examples of the anionic surfactant include polyoxyethylene alkyl ether acetate, dode-cylbenzene sulfonate, laurate, and polyoxyethylene alkyl ether sulfate salt. The above-listed examples may be used alone or in combination.

Examples of the nonionic surfactant include acetylene glycol-based surfactants, polyoxyethylene alkyl ether, polyoxyethylene alkyl phenyl ether, polyoxyethylene alkyl ester, and polyoxyethylene sorbitan fatty acid ester. The above-listed examples may be used alone or in combination.

Examples of the acetylene glycol-based Surfactant Include 2,4,7,9-tetramethyl-5-decyne-4,7-diol, 3,6-dimethyl-4-octyne-3,6-diol, 3,5-dimethyl-1-hexyne-3-diol, and 2,5,8,11-tetramethyl-6-dodecyne-5,8-diol. The above-listed examples may be used alone or in combination.

—Lubricant—

The lubricant is not particularly limited and may be appropriately selected depending on the intended purpose. Examples of the lubricant include higher fatty acid and metal salts thereof, higher fatty acid amide, higher fatty acid ester, animal wax, vegetable wax, mineral wax, and petroleum wax. The above-listed examples may be used alone or in combination.

—Filler—

Examples of the filler include: inorganic powder, such as calcium carbonate, silica, zinc oxide, titanium oxide, zirconium oxide, aluminium hydroxide, zinc hydroxide, barium sulfate, clay, kaolin, talc, surface-treated calcium, and surface-treated silica; and organic powder, such as a urea-formalin resin, a styrene-methacylic acid copolymer, a polystyrene resin, and a vinylidene chloride resin. The above-listed examples may be used alone or in combination.

An amount of the filler is not particularly limited and may be appropriately selected depending on the intended purpose. The amount of the filler is preferably 0.5 parts by mass or greater but 5.0 parts by mass or less, and more preferably 1.0 part by mass or greater but 4.0 parts by mass or less, relative to 1 part by mass of the binder resin.

—UV Absorber—

The UV absorber is not particularly limited and may be appropriately selected depending on the intended purpose. Examples of the UV absorber include a salicylic acid-based UV absorber, a benzophenone-based UV absorber, and a benzotriazole-based UV absorber.

Examples of the UV absorber include phenyl salicylate, p-tert-butylphenylsalicylate, p-octylphenylsalicylate, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, bis(2-methoxy-4-hydroxy-5-benzoylphenyl)methane, 2-(2'-hydroxy-5'-methylphenyl) benzotriazole, 2-(2'-hydroxy-5'-tert-butylphenyl) benzotriazole, 2-(2'-hydroxy-3',5'-di-tert-butylphenyl) benzotriazole, 2-(2'-hydroxy-3',5'-di-tert-butylphenyl) chlorobenzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-{2'-hydroxy-3'-(3",4",5",6"-tetrahydrophthalimidemethyl)-5'-methylphenyl}benzotriazole, 2,2'-methylenebis {4-(1,1,3,3-tetramethylbutyl)-6-(2H-benzotriazol-2-yl)phenol}, 2-(2'-hydroxy-5'-methacryloxyphenyl)-2H-benzotriazole, 2-(3,5-di-t-amyl-2-hydroxyphenyl)benzotriazole, 2-(2'-hydroxy-5'-t-octylphenyl)benzotriazole, and 2-(5-methyl-2-hydroxyphenyl)benzotriazole. The above-listed examples may be used alone or in combination.

—Color Pigment—

The color pigment is not particularly limited and may be appropriately selected depending on the intended purpose. Examples of the color pigment include chrome yellow, an iron oxide pigment, molybdate orange, cadmium red, a zinc sulfate compound, Hansa yellow, Hansa orange, para red, pyrazolone red, lionol red, copper phthalocyanine blue, copper polybromophthalocyanine blue, indanthrone blue, isodibenzanthrone violet, and anthanthrone orange. The above-listed examples may be used alone or in combination.

A preparation method of the thermosensitive recording layer coating liquid is not particularly limited and may be appropriately selected depending on the intended purpose. For example, the leuco dye and the color developer are ground and dispersed together with the binder resin by means of a disperser, such as a ball mill, an attritor, and a sand mill, followed by mixing with optional other components, to thereby prepare a thermosensitive recording layer coating liquid.

—Thermosensitive Recording Layer Coating Liquid—

A coating method of the thermosensitive recording layer coating liquid is curtain coating. The thermosensitive recording layer coating liquid is applied on the second underlayer by simultaneous curtain coating with the below-described second underlayer coating liquid. Since the thermosensitive recording layer is coated in the manner as described, high surface smoothness of the thermosensitive recording layer is achieved, and therefore a thermosensitive recording medium having excellent sensitivity and precision can be obtained.

—Curtain Coating—

The curtain coating is a method where a thin curtain film formed of a desired coating liquid, such as the thermosensitive recording layer coating liquid is formed between a heat from which the coating liquid is ejected and a coating target, and the curtain film is applied onto the coating target.

The simultaneous curtain coating is a method where curtain films of two or more coating liquids, such as a thermosensitive recording layer coating liquid, are simultaneously applied from separate heads or two or more coating outlets in one head. Since the simultaneous curtain coating is performed in the present disclosure, surface smoothness of a resultant thermosensitive recording layer is high and therefore a thermosensitive recording medium having excellent sensitivity and precision can be obtained. Moreover, simultaneous curtain coating of two or more layers can reduce the number of processes to be performed, and installation cost of equipment can be reduced.

Coating liquids to be applied by simultaneous curtain coating are not limited to the thermosensitive recording layer coating liquid and the second underlayer coating liquid, and may be appropriately selected depending on the intended purpose. Examples thereof include the below-described first underlayer coating liquid and protective layer coating liquid.

Since the simultaneous curtain coating is applied by allowing the coating liquids to free fall onto a coating target, air bubbles may be included between the coating target and the coating liquids during the simultaneous curtain coating. If the coating liquids are dried in the state where the air bubbles are included, a film is formed at a surface and the air bubbles are tried to come out from the surface. As a result, holes may be formed in the surface of the film to leave marks that look like craters.

A method for confirming the presence of the air bubbles is not particularly limited and may be appropriately selected depending on the intended purpose. Examples thereof include a method where a cross-section of the thermosensitive recording medium is observed under a scanning microscope.

The 50% cumulative volume particle diameter ($D_{50}$) of the thermosensitive recording layer coating liquid is preferably 0.10 micrometers or greater but 3 micrometers or less, more preferably 0.10 micrometers or greater but 0.50 micrometers or less, and particularly preferably 0.10 micrometers or greater but 0.40 micrometers or less.

A deposition amount of the thermosensitive recording layer after drying is not particularly limited and may be appropriately selected depending on the intended purpose. For example, the deposition amount thereof is preferably 1.0 $g/m^2$ or greater but 20.0 $g/m^2$ or less, more preferably 2.0 $g/m^2$ or greater but 10.0 $g/m^2$ or less, and particularly preferably 2.0 $g/m^2$ or greater but 4.0 $g/m^2$ or less.

Surface tension of the thermosensitive recording layer coating liquid is not particularly limited and may be appropriately selected depending on the intended purpose. For example, the surface tension of the thermosensitive recording layer coating liquid is preferably lower than surface tension of the below-described second underlayer coating liquid. Since the surface tension of the thermosensitive recording layer coating liquid is lower than the surface tension of the second underlayer coating liquid, the thermosensitive recording layer is less likely to be affected by a surface configuration of the second underlayer, and therefore a thermosensitive recording medium having high surface smoothness can be obtained.

For example, the surface tension of the thermosensitive recording layer coating liquid is preferably 34 mN/m or greater but 41 mN/m or less, and more preferably 35 mN/m or greater but 39 mN/m or less.

<First Underlayer and Second Underlayer>

The first underlayer and the second underlayer each preferably include hollow filler, and may further include a pigment, a binder resin, a crosslinking agent, and other components according to the necessity.

Note that, in the present specification, the term "hollow filler" may be also referred to as hollow particles, and the term "underlayer" may be also referred to as an undercoat layer, a heat-insulation layer, or an intermediate layer.

—Hollow Filler—

The hollow filler includes particles each including a shell of a thermoplastic resin, voids inside the shell, and air or another gas in each void. The hollow filler is hollow filler, which has been obtained by performing a heat treatment on heat-expandable microparticles to foam, and has already expanded. Therefore, the hollow filler will not expanded anymore even if heat is applied again. The above-mentioned another is not particularly limited and may be appropriately selected depending on the intended purpose. Examples thereof include hydrocarbon.

An amount of the hydrocarbon is not particularly limited and may be appropriately selected depending on the intended purpose. The amount of the hydrocarbon gas is preferably 0.2% by mass or greater, more preferably 0.5% by mass or greater but 20.0% by mass or less, and even more preferably 1.0% by mass or greater but 15.0% by mass or less, relative to a mass of the hollow filler. When the amount of the hydrocarbon gas is 0.2% by mass or greater, deformation of the hollow filler by calendering can be prevented to suppress decrease in sensitivity of a resultant thermosensitive recording medium.

The shape, size, etc. of the hollow filler are not particularly limited. The hollow filler preferably has the following volume average particle diameter (Dv) and porosity (%).

The volume average particle diameter (outer diameter of particles) of the hollow filler is not particularly limited and may be appropriately selected depending on the intended purpose. The volume average particle diameter thereof is preferably 1 micrometer or greater but 10 micrometers or less, and more preferably 1 micrometer or greater but 6 micrometers or less. When the volume average particle diameter of the hollow filler is 1 micrometer or greater but 10 micrometers or less, smoothness of a surface of the underlayer can be improved, and precision of a print can be obtained.

For example, the volume average particle diameter of the hollow filler can be measured by means of a laser diffraction/scattering particle size distribution measuring device (Microtrac ASVR, available from NIKKISO CO., LTD.).

The average porosity of the hollow filler is not particularly limited and may be appropriately selected depending on the intended purpose. The average porosity thereof is preferably 71% or greater but 95% or less, more preferably 80% or greater but 95% or less, and particularly preferably 85% or greater but 95% or less.

When the average porosity is 71% or greater but 95% or less, thermal insulation can be sufficiently secured, and thermal energy is transmitted via the support to thereby improve the sensitivity of the thermal recording medium.

Note that, the porosity is a ratio between an outer diameter and inner diameter (diameter of pore) of the hollow filler, and is represented by the following formula. The average porosity is a value obtained by dividing the calculated porosity by the number of particles of the hollow filler.

$$\text{Porosity (\%)} = (\text{inner diameter of hollow particles}/\text{outer diameter of hollow particles}) \times 100$$

As described above, the hollow filler has shells of a thermoplastic resin. The thermoplastic resin is not particularly limited and may be appropriately selected depending on the intended purpose. Examples thereof include a styrene resin, a styrene-acryl copolymer resin, a polyvinyl chloride resin, a vinylidene chloride resin, an acrylonitrile resin, and a copolymer of methacrylic acid. The above-listed examples may be used alone or in combination.

A monomer component used for the hollow filler is not particularly limited. Examples thereof include: nitrile-based monomers, such as acrylonitrile, methacrylonitrile, and fumaronitrile; carboxyl group-containing monomers, such as acrylic acid, methacrylic acid, ethacrylic acid, crotonic acid, cinnamic acid, maleic acid, itaconic acid, fumaric acid, citraconic acid, and chloromaleic acid; halogenated vinyl-based monomers, such as vinyl chloride; halogenated vinylidene-based monomers, such as vinylidene chloride; vinyl ester-based monomers, such as vinyl acetate, vinyl propionate, and vinyl butyrate; (meth)acrylic acid ester-based monomers, such as methyl (meth)acrylate, ethyl (meth)acrylate, n-butyl (meth)acrylate, t-butyl(meth)acrylate, 2-ethylhexyl(meth)acrylate, stearyl (meth)acrylate, phenyl (meth)acrylate, isobornyl (meth)acrylate, cyclohexyl (meth)acrylate, benzyl (meth)acrylate, and 2-hydroxyethyl (meth)acrylate; (meth)acrylamide-based monomers, such as acrylamide, substituted acrylamide, methacrylamide, and substituted methacrylamide; maleimide-based monomers, such as N-phenylmaleimide, and N-cyclohexylmaleimide; styrene-based monomers, such as styrene, and $\alpha$-methylstyrene; ethylene unsaturated monoolefin-based monomers, such as ethylene, propylene, and isobutylene; vinyl ether-based monomers, such as vinyl methyl ether, vinyl ethyl ether, and vinyl isobutyl ether; vinyl ketone-based monomers, such as vinyl methyl ketone; N-vinyl monomers, such as N-vinylcarbazole, and N-vinylpyrolidon; and vinyl naphthalene salts. As the monomer component, the above-listed radical polymerizable monomers may be used alone or in combination. The term "(meth)acryl" means acryl and methacryl.

When the monomer component includes the nitrile-based monomer as a key component, gas barrier properties of a shell polymer constituting shells of the hollow particles are excellent. Therefore, use of the nitrile-based monomer in the monomer component is preferable because deformation of the hollow filler during calendaring can be prevented, and reduction in sensitivity of a resultant thermosensitive recording medium can be prevented, when the hollow particles are used in the underlayer of the recording medium. As the nitrile-based monomer, acrylonitrile and methacrylonitrile are preferable because of readily availability thereof, desirable gas barrier properties, and high solvent resistance.

When the nitrile-based monomers include acrylonitrile (AN) and methacrylonitrile (MAN), a mass ratio (AN/MAN) of acrylonitrile to methacrylonitrile is not particularly limited. The mass ratio (AN/MAN) is preferably from 10/90 through 90/10, more preferably from 20/80 through 80/20, and particularly preferably from 30/70 through 70/30. When the mass ratio (AN/MAN) is less than 10/90, gas barrier properties of the shell polymer constituting shells of the hollow particles may be low, and therefore deformation of the hollow particles may be caused by calendaring to reduce sensitivity of a resulting thermosensitive recording medium, when the hollow particles are used in the underlayer of the thermosensitive recording medium. When the mass ratio (AN/MAN) is greater than 90/10, a sufficient porosity may not be achieved, and therefore sensitivity of a resulting thermosensitive recording medium may be low due to insufficient heat insulation when the hollow particles are used in the underlayer of the thermosensitive recording medium.

The hollow filler includes preferably the nitrile-based monomer in the amount of 80% by mass or greater, more preferably 85% by mass or greater, even more preferably 90% by mass or greater, and particularly preferably 95% by mass or greater, relative to a total amount of the thermoplastic resin. When the amount of the nitrile-based monomer is 80% by mass or greater relative to a total amount of the thermoplastic resin in the hollow filler, gas barrier properties of the shell polymer constituting the shells of the hollow particles are excellent, and therefore deformation of the hollow filler by calendaring can be prevented when the hollow filler is used in the underlayer of the thermosensitive recording medium. In view of both prevention of deformation of the hollow filler and precision of the thermosensitive recording medium, the amount of the nitrile-based monomer is preferably 85% by mass or greater but 95% by mass or less.

As the thermoplastic resin, in addition to the thermoplastic resins listed above, any of phenol-formaldehyde resins, urea-formaldehyde resins, melamine-formaldehyde resins, furan resins, unsaturated polyester resins formed by addition polymerization, or crosslinked MMA resins.

Examples of an analysis method of components of the shells of the hollow filler include gas chromatography/mass spectrometry.

A production method of the hollow particles is not particularly limited, and the hollow particles can be formed by any of various methods known in the art. For example, generally used is a method where thermally expandable capsule particles, each including a thermoplastic resin, which has not been formed, as a shell, and hydrocarbon encapsulated in each shell as a core material, are formed, and the resin particle are heated and foamed. Examples of a method of heat foaming include dry heat expansion and wet heat expansion. A temperature for heat foaming the thermally expandable particles is preferably 60 degrees Celsius or higher but 350 degrees Celsius or lower.

—Pigment—

The pigment is not particularly limited and may be appropriately selected depending on the intended purpose. Examples of the pigment include: inorganic powder, such as aluminium hydroxide, calcium carbonate, kaolin, calcined kaolin, silica, zinc oxide, titanium oxide, zinc hydroxide, barium sulfate, clay, talc, surface-treated calcium, and surface-treated silica; and organic powder, such as silicone resin particles, a urea-formalin resin, a styrene-methacylic acid copolymer, a polystyrene resin, and a polymethyl methacrylate. The above-listed examples may be used alone or in combination.

An amount of the pigment is preferably 110 parts by mass or greater, and more preferably 110 parts by mass or greater but 500 parts by mass or less, relative to 100 parts by mass of the binder.

—Binder Resin—

The binder resin is not particularly limited and may be appropriately selected depending on the intended purpose. The binder resin is preferably a water-soluble polymer or an aqueous polymer emulsion.

The water-soluble polymer is not particularly limited and may be appropriately selected depending on the intended purpose. Examples of the water-soluble polymer include polyvinyl alcohol, modified polyvinyl alcohol (e.g., polyvinyl alcohol including a carboxyl group), starch or derivatives thereof, cellulose derivatives (e.g., methoxy cellulose, hydroxyethyl cellulose, carboxy methyl cellulose, methyl cellulose, and ethyl cellulose), polyurethane, sodium polyacrylate, polyvinyl pyrrolidone, an acrylamide-acrylic ester copolymer, an acrylamide-acrylic acid ester-methacrylic acid terpolymer, an alkali salt of a styrene-maleic anhydride copolymer, polyacrylamide, sodium alginate, gelatin, and casein. The above-listed examples may be used alone or in combination.

The aqueous polymer emulsion is not particularly limited and may be appropriately selected depending on the intended purpose. Examples of the aqueous polymer emulsion include: latex of an acryl resin, a modified acryl resin (e.g., an acryl resin including a carboxyl group), a styrene-butadiene copolymer, and a styrene-butadiene-acryl terpolymer; and emulsions of a vinyl acetate resin, a vinyl acetate-acrylic acid copolymer, a styrene-acrylic acid ester copolymer, an acrylic acid ester resin, and a polyurethane resin. The above-listed examples may be used alone or in combination.

An amount of the binder resin in the underlayer is not particularly limited and may be appropriately selected depending on the intended purpose. The amount of the binder resin is preferably 30 parts by mass or greater but 300 parts by mass or less, and more preferably 40 parts by mass or greater but 200 parts by mass or less, relative to 100 parts by mass of the hollow particles.

When the amount of the binder resin is 30 parts by mass or greater but 300 parts by mass or less, sufficient binding force between the support and the underlayer can be obtained and therefore desirable coloring can be obtained.

—Crosslinking Agent—

The crosslinking agent is not particularly limited and may be appropriately selected depending on the intended purpose. Examples of the crosslinking agent include a compound including an oxazoline group, a glyoxal derivative, a methylol derivative, an epichlorohydrin derivative, an epoxy compound, an aziridine compound, hydrazine, hydrazide derivative, and carbodiimide derivative. The above-listed examples may be used alone or in combination.

—Other Components—

The above-mentioned other components are not particularly limited and may be appropriately selected depending on the intended purpose. Examples thereof include a surfactant, filler, and a lubricant.

—First Underlayer Coating Liquid—

A preparation method of the first underlayer coating liquid is not particularly limited and may be appropriately selected depending on the intended purpose. For example, the underlayer coating liquid can be prepared by dispersing the binder resin, the hollow filler, water, preferably a crosslinking agent, and optionally other components by means of a disperser.

A coating method of the first underlayer coating liquid is not particularly limited and may be appropriately selected depending on the intended purpose. Examples thereof include rod-blade coating, roll-blade coating, gravure coating, gravure offset coating, bar coating, roll coating, knife coating, air knife coating, comma coating, U-comma coating, AKKU coating, smoothing coating, microgravure coating, reverse roll coating, 4-roll or 5-roll coating, dip coating, curtain coating, slide coating, and die coating.

A deposition amount of the first underlayer after drying is not particularly limited and may be appropriately selected depending on the intended purpose. The deposition amount thereof is preferably 3 $g/m^2$ or greater but 15 $g/m^2$ or less, and more preferably 5 $g/m^2$ or greater but 10 $g/m^2$ or less.

For example, a viscosity of the first underlayer coating liquid is preferably 50 mPa·s or greater but 5,000 mPa·s or less, more preferably 50 mPa·s or greater but 2,000 mPa·s or less, and particularly preferably 100 mPa·s or greater but 1,000 mPa·s or less.

—Second Underlayer Coating Liquid—

A preparation method of the second underlayer coating liquid is not particularly limited and may be appropriately selected depending on the intended purpose. For example, the underlayer coating liquid can be prepared by dispersing the binder resin, the hollow filler, water, preferably a cross-linking agent, and optionally other components by means of a disperser.

A coating method of the second underlayer coating liquid is curtain coating. The second underlayer coating liquid is applied onto the first underlayer by simultaneous curtain coating together with the thermosensitive recording layer coating liquid. As a result, the surface smoothness of the thermosensitive recording layer increases, and a thermosensitive recording medium having excellent sensitivity and precision can be obtained.

A deposition amount of the second underlayer after drying is not particularly limited and may be appropriately selected depending on the intended purpose. The amount thereof is preferably 1 $g/m^2$ or greater but 20 $g/m^2$ or less, and more preferably 2 $g/m^2$ or greater but 10 $g/m^2$ or less.

Surface tension of the second underlayer coating liquid is not particularly limited and may be appropriately selected depending on the intended purpose. The surface tension of the second underlayer coating liquid is preferably higher than surface tension of the thermosensitive recording layer coating liquid. Since the surface tension of the second underlayer coating liquid is higher than the surface tension of the thermosensitive recording layer coating liquid, the thermosensitive recording layer is not easily affected by a surface configuration of the second underlayer, and therefore a thermosensitive recording medium having high surface smoothness can be obtained.

For example, the surface tension of the second underlayer coating liquid is preferably 38 mN/m or greater but 44 mN/m or less, and more preferably 40 mN/m or greater but 43 mN/m or less.

<Support>

A shape, structure, size, color tone, material, etc. of the support are not particularly limited and may be appropriately selected depending on the intended purpose. Examples of the shape thereof include a flat plate, and a sheet. The structure thereof may be a single-layer structure, or a laminate structure. The size thereof can be appropriately selected depending on the size of the thermosensitive recording medium etc.

A material of the support is not particularly limited and may be appropriately selected depending on the intended purpose. Examples thereof include an inorganic material and an organic material.

Examples of the inorganic material include glass, quartz, silicon, silicon oxide, aluminium oxide, $SiO_2$, and metals.

Examples of the organic material include: paper, such as woodfree paper, art paper, coated paper, and synthetic paper; cellulose derivatives, such as cellulose triacetate; and plastic films, such as of a polyester resin (e.g., polyethylene terephthalate (PET), and polybutylene terephthalate), polycarbonate, polystyrene, polymethyl methacrylate, polyethylene, and polypropylene. The above-listed examples may be used alone or in combination.

The support is preferably subjected to surface modification processing for the purpose of improving the adhesion. Examples thereof include corona discharge, an oxidation treatment (e.g., chromic acid), etching, an easy adhesion treatment, and an antistatic treatment.

An average thickness of the support is not particularly limited and may be appropriately selected depending on the intended purpose. The average thickness thereof is preferably 20 micrometers or greater but 2,000 micrometers or less, and more preferably 50 micrometers or greater but 500 micrometers or less.

<Adhesive Layer>

The adhesive layer is a layer formed of an adhesive, and may further include other components according to the necessity.

A material of the adhesive layer is not particularly limited and may be appropriately selected depending on the intended purpose. Examples of the material thereof include a urea resin, a melamine resin, a phenol resin, an epoxy resin, a vinyl acetate resin, a vinyl acetate-acryl copolymer, an ethylene-vinyl acetate copolymer, an acryl resin, a polyvinyl ether resin, a vinyl chloride-vinyl acetate copolymer, a polystyrene resin, a polyester resin, a polyurethane resin, a polyamide resin, a chlorinated polyolefin resin, a polyvinyl butyral resin, an acrylic acid ester copolymer, a methacrylic acid ester copolymer, natural rubber, a cyanoacrylate resin, and a silicone resin. The above-listed examples may be used alone or in combination.

—Other Components—

The above-mentioned other components are not particularly limited and may be appropriately selected depending on the intended purpose. As other components, any components that are usable in the adhesive layer can be used.

An embodiment of the thermosensitive recording medium of the present disclosure is not particularly limited and may be appropriately selected depending on the intended purpose. For example, the thermosensitive recording medium may be used as it is as a label. Alternatively, a layer, onto which information, such as characters, marks, pictures, barcodes, or two-dimensional codes, such as QR codes (registered trademark) is printed, may be disposed on or above the protective layer or the support.

Moreover, an embodiment of the thermosensitive recording medium of the present disclosure is not particularly limited and may be appropriately selected depending on the intended purpose. For example, the thermosensitive recording medium may be used as a sticker-type thermosensitive recording medium or a thermosensitive recording label by bonding release paper onto the adhesive layer.

The release paper is not particularly limited and may be appropriately selected depending on the intended purpose. Examples thereof include laminates of acid-free paper, acid paper, or plastics. Moreover, the predetermined illustration, such as color logos, or fixed phrase may be printed at the side of the support opposite to the side thereof at which the thermosensitive recording layer is formed by a printing method, such as inkjet printing and offset printing.

A shape of the thermosensitive recording medium of the present disclosure is not particularly limited and may be appropriately selected depending on the intended purpose. Examples thereof include a label, a sheet, and a roll. Moreover, the thermosensitive recording medium may be a liner-less thermosensitive recording medium where the release layer is formed on the support, and the thermosensitive recording medium is wound into a roll.

Perforations may be formed in the thermosensitive recording medium of the present disclosure in order to prevent fraudulent replacement of the thermosensitive recording medium bonded onto an article. Since the perforations are formed, the strength of paper where the perforations are formed weakens and therefore the label (the thermosensitive recording medium with an adhesive) itself is easily torn when peeling of the label from the article is attempted. Shapes of the perforations are not particularly limited and may be appropriately selected depending on the intended purpose.

The perforations are arranged in a manner that a cut length of each perforation is twice or greater the length of an uncut portion between the perforations, where the length of the uncut portion is 1.5 mm or less. More preferably, the cut length of each perforation is from 3 times through 10 times the length of the uncut portion.

A structure of the liner-less thermosensitive recording label is not particularly limited and may be appropriately selected. Examples thereof include a roll, a sheet, and a film. Among the above-listed examples, a roll is preferable in view of convenience.

<Protective Layer>

The protective layer preferably includes a binder and a pigment. The protective layer more preferably further includes a lubricant, and a crosslinking agent. The protective layer may further include other components according to the necessity. In the present specification, the protective layer may be also referred to as an overlayer.

<<Binder>>

The binder is not particularly limited and may be appropriately selected depending on the intended purpose. Examples of the binder include a water-soluble resin, a water-soluble resin emulsion, a hydrophobic resin, a UV curable resin, and an electron-beam curable resin. The above-listed examples may be used alone or in combination. Among the above-listed examples, a water-soluble resin is preferable in view of heat matching properties in low temperature and low humidity conditions.

Examples of the water-soluble resin include: polyvinyl alcohol; modified polyvinyl alcohol; cellulose derivatives, such as methyl cellulose, methoxy cellulose, and hydroxyl cellulose; casein; gelatin; polyvinyl pyrrolidone; a styrene-maleic anhydride copolymer; a diisobutylene-maleic anhydride copolymer; polyacrylamide; modified polyacrylamide; a methyl vinyl ether-maleic anhydride copolymer; carboxyl-modified polyethylene; a polyvinyl alcohol-acrylamide block copolymer; a melamine-formaldehyde resin; and urea-formaldehyde resin. The above-listed examples may be used alone or in combination. Among the above-listed examples, polyvinyl alcohol is preferable in view of plasticizer resistance.

Examples of the hydrophobic resin include polyvinyl acetate, polyurethane, a styrene-butadiene copolymer, a styrene-butadiene-acryl terpolymer, polyacrylic acid, polyacrylate, a vinyl chloride-vinyl acetate copolymer, polybutyl methacrylate, polyvinyl butyral, polyvinyl acetal, ethyl cellulose, and an ethylene-vinyl acetate copolymer. The above-listed examples may be used alone or in combination.

The average degree of polymerization of the binder is not particularly limited and may be appropriately selected depending on the intended purpose. The average degree of polymerization thereof is preferably 1,700 or greater. When the average degree of polymerization of the binder is 1,700 or greater, plasticizer resistance and heat matching properties under low temperature and low humidity conditions can be improved.

For example, the average degree of polymerization of the binder can be measured according to the test method specified in JIS K 6726.

<<Pigment>>

The pigment is not particularly limited and may be appropriately selected depending on the intended purpose. Examples of the pigment include: inorganic powder, such as aluminium hydroxide, calcium carbonate, kaolin, silica, zinc oxide, titanium oxide, zinc hydroxide, barium sulfate, clay, talc, surface-treated calcium, and surface-treated silica; and organic powder, such as silicone resin particles, a urea-formalin resin, a styrene-methacrylic acid copolymer, a polystyrene resin, and a polymethyl methacrylate. The above-listed examples may be used alone or in combination.

An amount of the pigment is preferably 110 parts by mass or greater, and more preferably 110 parts by mass or greater but 200 parts by mass or less, relative to 100 parts by mass of the binder. When the amount of the pigment relative to 100 parts by mass is 110 parts by mass or greater, transfer of inorganic particles of an ink-receiving layer onto a surface of the protective layer can be prevented even when the thermosensitive recording medium is stored in the form of a roll.

<<Lubricant>>

The lubricant is not particularly limited and may be appropriately selected depending on the intended purpose. Examples thereof include polyethylene oxide wax, montan wax, zinc stearate, and silicone wax. The above-listed examples may be used alone or in combination.

As the lubricant, any of other lubricants known in the art may be optionally used in combination with any of the above-listed lubricants. Examples thereof include: vegetable wax, such as candelilla wax, carnauba wax, rice bran wax, Japanese wax, and jojoba oil; animal wax, such as bees wax, lanolin, and spermaceti; mineral wax and derivatives thereof, such as ceresin; petroleum wax, such as paraffin, Vaseline, microcrystalline wax, and petrolactum wax; synthetic hydrocarbon wax, such as Fischer-Tropsch wax; hydrogenated wax, such as hydrogenated caster oil, and hydrogenated caster oil derivative; fatty acids, such as stearic acid, oleic acid, erucic acid, lauric acid, sebacic acid, behenic acid, and palmitic acid; amides of adipic acid, isophthalic acid, etc.; bisamides, esters, ketones, metal salts, and derivatives thereof; and silicone resins, such as an alkyl-modified silicone resin and an amide-modified silicone resin. The above-listed examples may be used alone or in combination.

<<Crosslinking Agent>>

The crosslinking agent is not particularly limited and may be appropriately selected depending on the intended purpose. Examples of a water resistant additive of a water-soluble resin include a polyamide epichlorohydrin resin, and adipic acid dihydrazide. The above-listed examples may be used alone or in combination.

A formation method of the protective layer is not particularly limited, and the protective layer may be formed any of the methods known in the art. Examples thereof include a method where a pigment and a crosslinking agent are each ground and dispersed in a binder resin together with other components by a disperser, such as a ball mill, an attritor, and a sand mill to achieve dispersed particle diameters of 0.1 micrometers or greater but 3 micrometers or less, optionally followed by blending with a lubricant with a predetermined formulation, to thereby prepare a protective layer coating liquid, and the protective layer coating liquid is applied onto the thermosensitive recording layer to thereby form a protective layer.

As a coating amount of the protective layer coating liquid, a dry weight thereof is preferably 0.1 $g/m^2$ or greater but 20 $g/m^2$ or less, and more preferably 0.5 $g/m^2$ or greater but 10 $g/m^2$ or less. When the coating amount of the protective layer coating liquid is 0.1 $g/m^2$ or greater but 20 $g/m^2$ or less, plasticizer resistance and head matching properties in a low temperature and low humidity environment can be improved.

<Other>

Other layers are not particularly limited and may be appropriately selected depending on the intended purpose. Examples thereof include a backcoat layer, and a release layer.

<<Backcoat Layer>>

The backcoat layer may be optionally disposed on a surface of the support at the side of which the thermosensitive recording layer is not disposed.

The backcoat layer includes filler and a binder resin, and may further include other components, such as a lubricant and a color pigment, according to the necessity.

As the filler, for example, inorganic filler or organic filler may be used.

Examples of the inorganic filler include carbonate, silicate, metal oxide, and a sulfuric acid compound.

Examples of the organic filler include a silicone resin, cellulose, an epoxy resin, a nylon resin, a phenol resin, a polyurethane resin, a urea resin, a melamine resin, a polyester resin, a polycarbonate resin, a styrene resin, an acryl resin, a polyethylene resin, a formamide resin, and a polymethyl methacrylate resin.

The binder resin is not particularly limited and may be appropriately selected depending on the intended purpose. For example, the binder resin identical to any of the binder resins listed for the thermosensitive recording layer can be used. The average thickness of the backcoat layer is not particularly limited and may be appropriately selected depending on the intended purpose. The average thickness thereof is preferably 0.1 micrometers or greater but 20 micrometers or less, and more preferably 0.3 micrometers or greater but 10 micrometers or less.

<<Release Layer>>

When the thermosensitive recording medium is a linerless thermosensitive recording medium, the release layer is disposed as the outermost surface layer at the side where the thermosensitive recording layer is disposed relative to the support. Examples of a release agent used in the release layer include a UV-curing silicone resin, a thermoset silicone resin, and a fluoro-release agent. The above-listed examples may be used alone or in combination. Among the above-listed examples, a UV-curing silicone resin is preferable as a curing speed is fast, and release stability is excellent over time.

Examples of the UV-curing silicone resin include a silicone resin that is cured by cationic polymerization, and a silicone resin that is cured by radical polymerization. When the silicone resin that is cured by radical polymerization is used, volume construction of the silicone resin may occur during curing, and as a result the support may be curled.

A deposition amount of the release layer after drying is preferably 0.2 $g/m^2$ or greater but 2.0 $g/m^2$ or less. Since the deposition amount thereof after drying is 0.2 $g/m^2$ or greater but 2.0 $g/m^2$ or less, appropriate release force is achieved, and therefore paper jam in a printer during feeding can be prevented.

(Method for Producing Thermosensitive Recording Medium)

The method for producing a thermosensitive recording medium of the present disclosure includes a first underlayer forming step, a second underlayer forming step, and a thermosensitive recording layer forming step, and may further include other steps according to the necessity. In the second underlayer forming step and the thermosensitive recording layer forming step, a second underlayer and a thermosensitive recording layer are formed by simultaneous curtain coating.

The method for producing a thermosensitive recording medium of the present disclosure can produce a thermosensitive recording medium having surface smoothness of 1,000 s or greater.

<First Underlayer Forming Step>

The first underlayer forming step is a step including applying a first underlayer coating liquid onto a support to form a first underlayer.

A method for applying the first underlayer coating liquid is not particularly limited and may be appropriately selected depending on the intended purpose. Examples thereof include Vari-bar coating, blade coating, gravure coating, gravure offset coating, bar coating, roll coating, knife coating, air knife coating, comma coating, U-comma coating, AKKU coating, smoothing coating, microgravure coating, reverse roll coating, 4-roll or 5-roll coating, dip coating, curtain coating, slide coating, and die coating.

<Second Underlayer Forming Step>

The second underlayer forming step is a step including applying a second underlayer coating liquid to form a second underlayer.

A method for applying the second underlayer coating liquid is curtain coating. The second underlayer coating liquid are applied onto the first underlayer by simultaneous curtain coating with the thermosensitive recording layer coating liquid. As a result, high surface smoothness of the thermosensitive recording layer is achieved, and a thermosensitive recording medium having sensitivity and precision can be obtained.

<Thermosensitive Recording Layer Forming Step>

The thermosensitive recording layer forming step is a step including applying a thermosensitive recording layer coating liquid onto the second underlayer to form a thermosensitive recording layer.

A method for applying the thermosensitive recording layer coating liquid is curtain coating. The thermosensitive recording layer coating liquid is applied onto the second underlayer by simultaneous curtain coating with the second underlayer coating liquid. As a result, high surface smoothness of the thermosensitive recording layer is achieved, and a thermosensitive recording medium having sensitivity and precision can be obtained.

Since the second underlayer and the thermosensitive recording layer are formed by simultaneous curtain coating, air bubbles may be included at an interface between the second underlayer and the thermosensitive recording layer.

A surface modification treatment, such as a corona discharge treatment, an oxidization reaction treatment (e.g., chromic acid), an etching treatment, an easy adhesion treatment, and an antistatic treatment, is preferably performed on a surface of the support on which the thermosensitive recording layer is to be formed before coating of the thermosensitive recording layer coating liquid. The adhesion between the support and the thermosensitive recording layer can be improved by the surface modification treatment. Other than the above-listed surface modification treatments, for example, a layer including a styrene-butadiene copolymer (easy adhesion layer) is formed on the support, followed by forming a thermosensitive recording layer on the layer including the styrene-butadiene copolymer. As a result, peeling of the thermosensitive recording layer can be prevented.

<Other Steps>

Examples of other steps include an adhesive layer forming step and a protective layer forming step. When the thermosensitive recording medium is a sticker type thermosensitive recording medium, release paper is preferably bonded onto the adhesive layer. A method for bonding the release paper is not particularly limited and any of commonly used methods may be used.

When the thermosensitive recording medium is a linerless thermosensitive recording medium, a release layer coating liquid is applied onto a surface of the support opposite to the side thereof at which the thermosensitive recording layer is formed. A method for applying the release layer coating liquid may be any of the methods listed as the method for applying the first underlayer coating liquid.

<Adhesive Layer Forming Step>

The adhesive layer forming step is any of formation methods typically used in the art. For example, an adhesive layer is formed by applying an adhesive onto a support by a coating method, such as bar coating, roll coating, comma coating, and gravure coating, followed by drying the adhesive.

<Calendering Step>

The step for smoothing the surface by calendaring is not particularly limited and may be appropriately selected depending on the intended purpose. Examples thereof include supercalendering, gloss calendaring, and machine calendaring. The pressure applied during the calendaring is not particularly limited and may be appropriately selected depending on the intended purpose. The pressure is preferably 10 kg/$cm^2$ or greater but 50 kg/$cm^2$ or less.

(Recording Method)

A recording method using the thermosensitive recording medium of the present disclosure is not particularly limited and may be appropriately selected depending on the intended purpose. Examples thereof include a recording method using a thermal head, or a laser.

A shape, structure, size, etc. of the thermal head are not particularly limited and may be appropriately selected depending on the intended purpose.

The laser is not particularly limited and may be appropriately selected depending on the intended purpose. Examples thereof include a $CO_2$ laser emitting light having a wavelength of 9.3 micrometers or longer but 10.6 micrometers or shorter, and a semi-conductor laser.

(Use)

The thermosensitive recording medium of the present disclosure has high sensitivity and precision. Therefore, the thermosensitive recording medium can be used in various fields, such as a POS field (e.g., fresh food products, packed meals, and premade meals), a copying field (e.g., books and documents), a telecommunication field (e.g., facsimiles), a ticketing field (e.g., ticket machines, and receipts), packaging tags for the aviation industry, pill cases, and pill bottles.

(Article)

The article includes the thermosensitive recording medium of the present disclosure.

As the thermosensitive recording medium, the thermosensitive recording medium of the present disclosure is suitably used.

The phrase "including the thermosensitive recording medium of the present disclosure" means a state where the thermosensitive recording medium of the present disclosure is adhered or mounted.

The article of the present disclosure is not particularly limited and may be appropriately selected depending on the intended purpose, as long as the article includes the thermosensitive recording medium of the present disclosure. Examples thereof include packing materials, packaging materials, and wrapping paper. Particularly, the article may be an article for which solvent resistance is important.

EXAMPLES

The present disclosure will be described more specifically below by way of Examples. The present disclosure should not be construed as being limited to these Examples.

Preparation Example 1 of Thermosensitive Recording Layer Coating Liquid

<Dye Dispersion Liquid>

Leuco dye (3-dibutylamino-6-methyl-7-anilinofluoran): 20 parts by mass

10% by mass itaconic acid-modified polyvinyl alcohol aqueous solution (25-88KL, available from KURARAY CO., LTD.): 40 parts by mass Surfactant (Newcol 290 available from NIPPON NYUKAZAI CO., LTD., solid content: 100% by mass): 0.2 parts by mass Ion exchanged water: 40 parts by mass The mixture including the components listed above was dispersed to give an average particle diameter of 0.5 micrometers by means of a sand grinder to thereby prepare a dye dispersion liquid.

<Color Developer Dispersion Liquid>

4-hydroxy-4'-isopropoxydiphenylsulfone: 20 parts by mass

10% by mass itaconic acid-modified polyvinyl alcohol aqueous solution (25-88KL, available from KURARAY CO., LTD.): 20 parts by mass Amorphous silica (MIZUKASIL P527, available from MIZUSAWA INDUSTRIAL CHEMICALS, LTD.): 15 parts by mass Surfactant (PD-001 available from Nissin Chemical Industry Co., Ltd., solid content:

100% by mass)): 0.2 parts by mass

Ion exchanged water: 60 parts by mass

The mixture including the components listed above was dispersed to give an average particle diameter of 1.0 micrometer by means of a sand grinder to prepare a color developer dispersion liquid.

Next, 20 parts by mass of the dye dispersion liquid, 40 parts by mass of the color developer dispersion liquid, 5 parts by mass of styrene-butadiene copolymer latex (solid content: 47.5% by mass), 10 parts by mass of a 10% by mass itaconic acid-modified polyvinyl alcohol aqueous solution, and 40 parts by mass of ion exchanged water were mixed and stirred to thereby prepare a thermosensitive recording layer coating liquid.

Preparation Example 1 of Underlayer Coating Liquid

Styrene-butadiene copolymer latex (solid content: 47.5% by mass): 9.7 parts by mass 10% by mass polyvinyl alcohol aqueous solution (PVA117, available from KURARAY CO., LTD.): 11.5 parts by mass Calcined kaolin (product name: Ansilex 93, available from BASF): 19.2 parts by mass Ion exchanged water: 59.6 parts by mass The mixture including the components listed above was mixed and stirred to thereby prepare First Underlayer Forming Liquid A.

Preparation Examples 2 to 6 of Underlayer Coating Liquid

Underlayer Coating Liquids B to F were each prepared in the same manner as in Preparation Example 1 of the underlayer coating liquid, except that the composition of the hollow filler, the binder resin, and the pigment used in Preparation Example 1 of the underlayer coating liquid was changed as presented in Table 1.

TABLE 1

| | | Underlayer coating liquid | | | | | |
|---|---|---|---|---|---|---|---|
| | | A | B | C | D | E | F |
| Binder resin | styrene-butadiene copolymer latex (solid content: 47.5% by mass) | 9.7 | 9.7 | 20.2 | 12.2 | 12.2 | 2.3 |
| | 10% by mass polyvinyl alcohol aqueous solution | 11.5 | 11.5 | 24 | — | — | 21.7 |
| Pigment | calcined kaolin | 19.2 | — | — | 19.2 | — | 21.7 |
| | Hollow filler (particle diameter: 1 micrometer, porosity: 55%: solid content: 26.5%) | — | 72.6 | — | — | 72.6 | — |
| | Hollow filler (particle diameter: 4.5 micrometers, porosity: 90%, solid content: 33%) | — | — | 24.2 | — | — | — |
| | Ion exchanged water | 59.6 | 6.2 | 31.6 | 68.6 | 15.3 | 54.3 |

Preparation Example 1 of Overlayer Coating Liquid

<Preparation of Filler Dispersion Liquid>

The mixture having the following composition was ground and dispersed for 30 minutes by means of a sand grinder, to thereby prepare a filler dispersion liquid.

Aluminium hydroxide: 30 parts by mass

Ion exchanged water: 70 parts by mass

Next, the filler dispersion liquid and the liquids listed below were mixed and stirred to thereby prepare an overlayer coating liquid.

The filler dispersion liquid: 25 parts by mass

Aqueous solution of polyvinyl alcohol having a carboxyl group (KL-318 available from KURARAY CO., LTD., solid content: 17% by mass): 43 parts by mass Polyamide epichlorohydrin resin (WS-525 available from SEIKO PMC CORPORATION, solid content: 25% by mass): 12 parts by mass Ion exchanged water: 20 parts by mass Example 1

Underlayer Coating Liquid A was applied onto a surface of a support that was paper having a basis weight of 62 $g/m^2$ to give a deposition amount of 7 $g/m^2$ on dry basis by rod-blade coating to thereby form a first underlayer.

Next, Underlayer Coating Liquid B, the thermosensitive recording layer coating liquid, and the overlayer coating liquid were simultaneously applied onto the first underlayer by simultaneous curtain coating to form a second underlayer formed of Underlayer Coating Liquid B on the first underlayer, a thermosensitive recording layer formed of the thermosensitive recording layer coating liquid on the second underlayer, and an overlayer formed of the overlayer coating liquid on the thermosensitive recording layer, to thereby produce a thermosensitive recording medium. The second underlayer, the thermosensitive recording layer and the over layer were formed to give deposition amounts of 2 $g/m^2$, 3 $g/m^2$, and 1.5 $g/m^2$, respectively, on dry basis.

Examples 2 to 6 and Comparative Examples 1 to 4

Each thermosensitive recording medium was produced in the same manner as in Example 1, except that underlayer coating liquids used for forming a first underlayer and a second underlayer, and a coating method of each layer were changed as presented in Table 2.

TABLE 2

| | First underlayer | | Second underlayer | | | |
|---|---|---|---|---|---|---|
| | Underlayer coating liquid | Coating method | Underlayer coating liquid | Coating method | Thermosensitive recording layer Coating method | Overlayer Coating method |
| Ex. 1 | A | rod-blade coating | B | simultaneous curtain coating (second underlayer, thermosensitive recording layer, overlayer) | simultaneous curtain coating (second underlayer, thermosensitive recording layer, overlayer) | simultaneous curtain coating (second underlayer, thermosensitive recording layer, overlayer) |
| Ex. 2 | A | curtain coating | B | simultaneous curtain coating (second underlayer, thermosensitive recording layer, overlayer) | simultaneous curtain coating (second underlayer, thermosensitive recording layer, overlayer) | simultaneous curtain coating (second underlayer, thermosensitive recording layer, overlayer) |
| Ex. 3 | C | rod-blade coating | B | simultaneous curtain coating (second underlayer, | simultaneous curtain coating (second underlayer, | simultaneous curtain coating (second underlayer, |

TABLE 2-continued

| | First underlayer | | Second underlayer | | | |
|---|---|---|---|---|---|---|
| | Underlayer coating liquid | Coating method | Underlayer coating liquid | Coating method | Thermosensitive recording layer Coating method | Overlayer Coating method |
| | | | | thermosensitive recording layer, overlayer) | thermosensitive recording layer, overlayer) | thermosensitive recording layer, overlayer) |
| Ex. 4 | A | rod-blade coating | A | simultaneous curtain coating (second underlayer, thermosensitive recording layer, overlayer) | simultaneous curtain coating (second underlayer, thermosensitive recording layer, overlayer) | simultaneous curtain coating (second underlayer, thermosensitive recording layer, overlayer) |
| Ex. 5 | A | rod-blade coating | C | simultaneous curtain coating (second underlayer, thermosensitive recording layer, overlayer) | simultaneous curtain coating (second underlayer, thermosensitive recording layer, overlayer) | simultaneous curtain coating (second underlayer, thermosensitive recording layer, overlayer) |
| Ex. 6 | D | rod-blade coating | E | simultaneous curtain coating (second underlayer, thermosensitive recording layer, overlayer) | simultaneous curtain coating (second underlayer, thermosensitive recording layer, overlayer) | simultaneous curtain coating (second underlayer, thermosensitive recording layer, overlayer) |
| Comp. Ex. 1 | B | rod-blade coating | — | — | rod-blade coating | rod-blade coating |
| Comp. Ex. 2 | A | rod-blade coating | B | rod-blade coating | rod-blade coating | rod-blade coating |
| Comp. Ex. 3 | A | rod-blade coating | B | curtain coating | rod-blade coating | rod-blade coating |
| Comp. Ex. 4 | F | simultaneous curtain coating (first underlayer and second underlayer) | B | simultaneous curtain coating (first underlayer and second underlayer) | rod-blade coating | rod-blade coating |

Next, "surface smoothness" of the thermosensitive recording media of Examples and Comparative Examples was measured, and moreover, "sensitivity" and "precision" thereof were evaluated. The results are presented in Table 3.

(Surface Smoothness)

Surface smoothness was measured by means of the Oken-type smoothness tester according to JIS P-8155.

(Sensitivity)

Printing was performed on the thermosensitive recording medium by means of a print simulator (available from Ohkura Electric Co., Ltd.) with a pulse width of from 0.2 ms through 1.2 ms at head power of 0.45 w/dot, 1-line recording time of 20 ms/line, and a scanning line density of 8×3.85 dot/mm, and the print density was measured by means of Macbeth reflective densitometer RD-914 (available from Macbeth). The pulse width required to achieve the image density of 1.0 was calculated. From the calculated energy value, a sensitivity ratio was calculated using the following equation, when Comparative Example 1 was taken as a standard. The result was evaluated based on the following criteria.

Sensitivity ratio=(pulse width of Comparative Example 1)/(pulse width of the measured sample)

<Evaluation Criteria>

A: Sensitivity ratio is 1.11 or greater.

B: Sensitivity ratio is greater than 1.00 but less than 1.11.

CC: Sensitivity ratio is 1.00 or less.

(Precision)

The predetermined characters and image were printed on each thermosensitive recording medium (thermosensitive recording medium to which a printed section was not disposed) by means of a thermal label printer 1-4308 available from DATAMAX at printing speed of 8 ips to achieve a print density of 0.80. The printed image was visually observed and evaluated based on the following criteria.

<Evaluation Criteria>

A: There was no unfilled white spot or area in the characters or image.

B: There were a very few unfilled white spots or areas in the characters or image, but the characters and image could be recognized.

C: There were a few unfilled white spots or areas in the characters or image, and part of the characters or the image could not be recognized.

CC: There were unfilled white spots or areas in the characters and image, and the characters and image could not be recognized.

(Comprehensive Evaluation)

The worst evaluation result in each Example or Comparative Example was taken as a result of the comprehensive evaluation.

TABLE 3

| | Surface smoothness (s) | Simultaneous curtain coating of second underlayer and thermosensitive recording | Sensitivity | | Precision Evaluation | Comprehensive evaluation |
|---|---|---|---|---|---|---|
| | | | Sensitivity ratio | Evaluation | | |
| Ex. 1 | 1,800 | Yes | 1.11 | A | B | B |
| Ex. 2 | 1,500 | Yes | 1.09 | B | B | B |
| Ex. 3 | 2,500 | Yes | 1.15 | A | A | A |
| Ex. 4 | 1,050 | Yes | 1.02 | B | B | B |
| Ex. 5 | 2,800 | Yes | 1.13 | A | A | A |
| Ex. 6 | 1,250 | Yes | 1.08 | B | B | B |
| Comp. Ex. 1 | 550 | No | 1.00 | CC | CC | CC |
| Comp. Ex. 2 | 900 | No | 0.95 | CC | C | CC |
| Comp. Ex. 3 | 850 | No | 0.97 | CC | C | CC |
| Comp. Ex. 4 | 700 | No | 0.94 | CC | CC | CC |

For example, embodiments of the present disclosure are as follows.

<1> A thermosensitive recording medium including:

a support;

a first underlayer disposed on or above the support;

a second underlayer disposed on or above the first underlayer; and a thermosensitive recording layer disposed on or above the second underlayer, wherein the second underlayer and the thermosensitive recording layer are formed by simultaneous curtain coating, and surface smoothness of a surface of the thermosensitive recording medium is 1,000 s or greater.

<2> The thermosensitive recording medium according to <1>, wherein the surface smoothness is 1,600 s or greater.

<3> The thermosensitive recording medium according to <1> or <2>, wherein the surface smoothness is 2,000 s or greater.

<4> The thermosensitive recording medium according to any one of <1> to <3>, wherein the first underlayer, or the second underlayer, or both the first underlayer and the second underlayer include a pigment and a binder resin.

<5> The thermosensitive recording medium according to <4>, wherein the pigment included in the first underlayer is calcined kaolin.

<6> The thermosensitive recording medium according to <4> or <5>, wherein the second underlayer includes hollow filler.

<7> The thermosensitive recording medium according to any one of <4> to <6>, wherein the binder resin of the first underlayer, or the binder resin of the second underlayer, or both the binder resin of the first underlayer and the binder resin of the second underlayer include polyvinyl alcohol and a styrene-butadiene copolymer.

<8> A method for producing a thermosensitive recording medium, the method including:

forming a first underlayer on or above a support;

forming a second underlayer on or above the first underlayer; and forming a thermosensitive recording layer on or above the second underlayer, wherein the forming the second underlayer and the forming the thermosensitive recording layer are performed by simultaneous curtain coating.

The thermosensitive recording medium according to any one of <1> to <6>, and the method for producing a thermosensitive recording medium according to <7> or <8> can solve the above-described various problems existing in the art, and can achieve the object of the present disclosure.

REFERENCE SIGNS LIST

1: thermosensitive recording medium
11: support
12: underlayer
13: thermosensitive recording layer
14: protective layer
15: adhesive layer
16A, 17A: head
16B, 17B: curtain film

The invention claimed is:

1. A method for producing a thermosensitive recording medium, the method comprising:

forming a first underlayer by rod-blade coating, on or above a support;

forming a second underlayer comprising a hollow filler on or above the first underlayer; and forming a thermosensitive recording layer on or above the second underlayer;

wherein the forming the second underlayer and the forming the thermosensitive recording layer are performed by simultaneous curtain coating.

2. The method for producing a thermosensitive recording medium according to claim 1, the method further comprising:

forming a protective layer on or above the thermosensitive recording layer.

3. The method for producing a thermosensitive recording medium according to claim 2, wherein the forming of the second underlayer, the forming of the thermosensitive recording layer, and the forming of the protective layer are performed by simultaneous curtain coating so that the second under layer, thermal recording layer, and protective layer are formed in this order.

4. The method for producing a thermosensitive recording medium according to claim 1, wherein a surface smoothness of a surface of the thermosensitive recording medium is 1,000 s or greater.

5. The method for producing a thermosensitive recording medium according to claim 1, wherein a surface smoothness of a surface of the thermosensitive recording medium is 1,600 s or greater.

6. The method for producing a thermosensitive recording medium according to claim 1, wherein a surface smoothness of a surface of the thermosensitive recording medium is 2,000 s or greater.

7. The method for producing a thermosensitive recording medium according to claim 1, wherein the first underlayer, or the second underlayer, or both the first underlayer and the second underlayer include a pigment and a binder resin.

8. The method for producing a thermosensitive recording medium according to claim 7, wherein the pigment included in the first underlayer is calcined kaolin.

9. The method for producing a thermosensitive recording medium according to claim 7, wherein the binder resin of the first underlayer, or the binder resin of the second underlayer, or both the binder resin of the first underlayer and the binder resin of the second underlayer include polyvinyl alcohol and a styrene-butadiene copolymer.

* * * * *